US012775598B2

(12) United States Patent
Oberhofer et al.

(10) Patent No.: US 12,775,598 B2
(45) Date of Patent: Oct. 27, 2026

(54) DETERMINING DOMAIN AND MATCHING ALGORITHMS FOR DATA SYSTEMS

(71) Applicant: International Business Machines Corporation, Armonk, NY (US)

(72) Inventors: Martin Oberhofer, Sindelfingen (DE); Lars Bremer, Boeblingen (DE); Marcus Boone, Austin, TX (US); Geetha Sravanthi Pulipaty, Bangalore (IN); Christopher Jackson, Harrisburg, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/322,952

(22) Filed: May 18, 2021

(65) Prior Publication Data

US 2022/0374401 A1 Nov. 24, 2022

(51) Int. Cl.
*G06F 16/215* (2019.01)
*G06F 16/2458* (2019.01)
(Continued)

(52) U.S. Cl.
CPC ........ *G06F 16/215* (2019.01); *G06F 16/2462* (2019.01); *G06F 16/285* (2019.01); *G06N 20/00* (2019.01)

(58) Field of Classification Search
CPC .. G06F 16/215; G06F 16/285; G06F 16/2462; G06N 20/00
See application file for complete search history.

(56) References Cited

U.S. PATENT DOCUMENTS 8,515,987 B1 * 8/2013 Jain ........................ G06F 16/215 707/808
10,387,440 B2 8/2019 Mehta
(Continued)

FOREIGN PATENT DOCUMENTS

CA 2701046 A1 4/2009
JP 2006515140 A * 5/2006 ............ H04W 72/12

OTHER PUBLICATIONS

"Confusion matrix", Wikipedia, This page was last edited on Apr. 5, 2021, 5 pages, <https://en.wikipedia.org/wiki/Confusion_matrix>.
(Continued)

*Primary Examiner* — Khanh B Pham
*Assistant Examiner* — Brooks T Hale
(74) *Attorney, Agent, or Firm* — CHIP LAW GROUP

(57) ABSTRACT

A computer-implemented method for configuring data deduplication is disclosed. The computer-implemented method includes receiving source data. The computer-implemented method further includes analyzing the source data, wherein analyzing the source data includes generating data profiling statistics from the source data and classifying attributes of the source data. The computer-implemented method further includes determining at least one data domain associated with the source data based, at least in part, on the data profiling statistics, the classified attributes, and ontology data. The computer-implemented method further includes determining, for the at least one data domain associated with the source data, a number of required matching algorithms for a data matching engine to execute data deduplication within the source data.

21 Claims, 11 Drawing Sheets

(51) Int. Cl.
*G06F 16/28* (2019.01)
*G06N 20/00* (2019.01)

(56) References Cited

U.S. PATENT DOCUMENTS

| | | | | |
|---|---|---|---|---|
| 10,452,993 | B1 * | 10/2019 | Hart | G06N 20/00 |
| 10,621,492 | B2 | 4/2020 | Oberhofer | |
| 2006/0085854 | A1 * | 4/2006 | Agrawal | H04L 63/1408<br>726/23 |
| 2006/0218158 | A1 * | 9/2006 | Stuhec | G06F 16/258 |
| 2007/0055552 | A1 * | 3/2007 | St. Clair | G16H 50/20<br>705/3 |
| 2009/0089630 | A1 * | 4/2009 | Goldenberg | G06F 11/079<br>714/704 |
| 2010/0070505 | A1 * | 3/2010 | Kao | G06F 16/168<br>707/E17.046 |
| 2010/0138370 | A1 * | 6/2010 | Wu | G06F 16/9535<br>707/769 |
| 2011/0016095 | A1 * | 1/2011 | Anglin | G06F 11/1453<br>711/216 |
| 2015/0019499 | A1 * | 1/2015 | Aronovich | G06F 16/137<br>707/692 |
| 2018/0082197 | A1 * | 3/2018 | Aravamudan | G16B 50/00 |
| 2018/0253653 | A1 * | 9/2018 | Ozcan | G06F 16/367 |
| 2019/0310840 | A1 * | 10/2019 | Dufresne | G06N 5/00 |
| 2019/0377975 | A1 | 12/2019 | Pandit | |
| 2020/0134483 | A1 | 4/2020 | Bremer | |
| 2020/0210647 | A1 * | 7/2020 | Panuganty | G06N 3/08 |
| 2022/0221999 | A1 * | 7/2022 | Navon | G06F 3/0659 |

OTHER PUBLICATIONS

Fawcett, Tom, “An introduction to ROC analysis”, Elsevier, Pattern Recognition Letters 27 (2006) 861-874, Science Direct, Available online Dec. 19, 2005, 14 pages, doi:10.1016/j.patrec.2005.10.010.

* cited by examiner to FIG. 6

DETERMINING DOMAIN AND MATCHING ALGORITHMS FOR DATA SYSTEMS

BACKGROUND

The invention relates generally to data deduplication, and more specifically, to configuring data deduplication in a master data management system.

Aligning data based on its content, is more or less a daily task of enterprise IT (information technology) personnel. Often, data from different sources may need to be merged in order to achieve a series of different objects, such as checking for completeness, improving data quality, improving data completeness, finding duplicated entries, and so on. This may happen in data analysis or ABI (analytics and business intelligence) projects, in case of a merger of business units because of differently structured data sets, for a preparation of training data for AI (artificial intelligence) systems, and so on.

Enterprises have used MDM (master data management) systems data integration platforms or similar to tackle this problem. In such systems, real-world concepts (sometimes also abstract concepts) are defined in a way to which enterprise IT data may be mapped to define rules how to treat specific data and also as a common communication platform between the business side of an enterprise and the IT department.

Data integration using an MDM system is still hard today and has also been described as the long pole in any MDM project. However, sometimes the tasks may be more obvious like comparing personal records of a single person, wherein the personal records originate from different sources. Thereby, duplicate entries in the joint data source may be eliminated, the data quality of the data may be enhanced or, a master record may be built with a joint data of the different sources.

SUMMARY

According to one embodiment of the present invention, a computer implemented method for configuring data deduplication is provided. The computer-implemented method includes receiving source data. The computer-implemented method further includes analyzing the source data. Analyzing the source data includes generating data profiling statistics from the source data and classifying attributes of the source data. The computer-implemented method further includes determining at least one data domain associated with the source data based, at least in part, on the data profiling statistics, the classified attributes, and ontology data. The computer-implemented method further includes determining, for the at least one data domain associated with the source data, a number of required matching algorithms for a data matching engine to execute data deduplication within the source data.

According to another embodiment of the present invention, a computer system for configuring data deduplication is provided. The computer system includes a processor and a memory, communicatively coupled to the processor. The memory stores program code portions that, when executed, enable the processor to receive source data. The program code portions, when executed, further enable the processor to analyze the source data. Analyzing the source data includes generating data profiling statistics from the source data and classifying attributes of the source data. The program code portions, when executed, further enable the processor to determine at least one data domain associated with the source data based, at least in part, on the data profiling statistics, the classified attributes, and ontology data. The program code portions, when executed, further enable the processor to determine, for the at least one data domain associated with the source data, a number of required matching algorithms for a data matching engine to execute data deduplication within the source data.

According to another embodiment of the present invention, a computer program product for configuring data deduplication is provided. The computer program product includes a computer readable storage medium having program instructions embodied therewith. The program instructions include instructions to receive source data. The program instructions further includes instructions to analyze the source data. Analyzing the source data includes generating, data profiling statistics from the source data and classifying attributes of the source data. The program instructions further include instructions to determine at least one data domain associated with the source data based, at least in part, on the data profiling statistics, the classified attributes, and ontology data. The program instructions further include instructions to determine, for the at least one data domain associated with the source data, a number of required matching algorithms for a data matching engine to execute data deduplication within the source data.

BRIEF DESCRIPTION OF DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
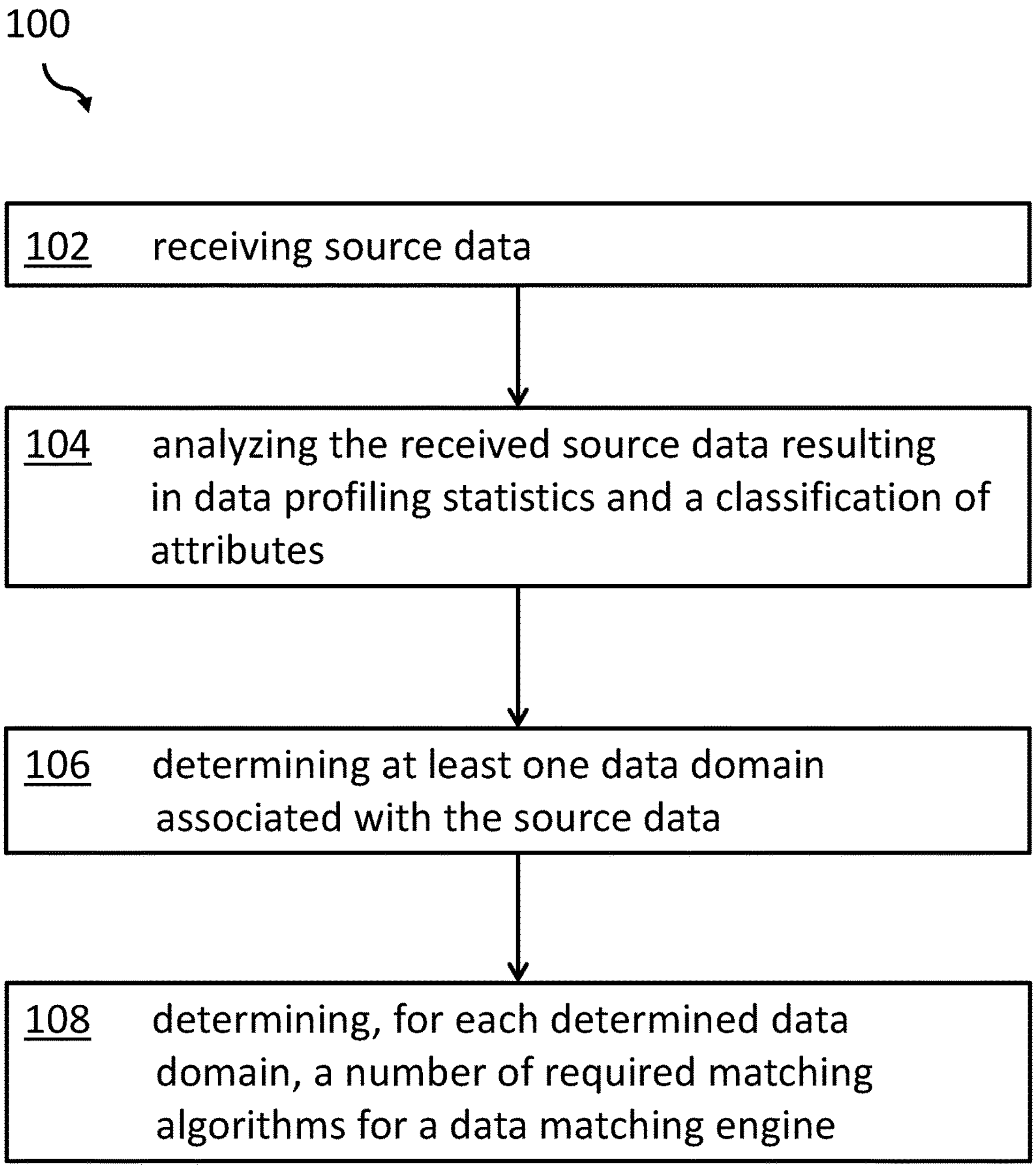
Figure 2:
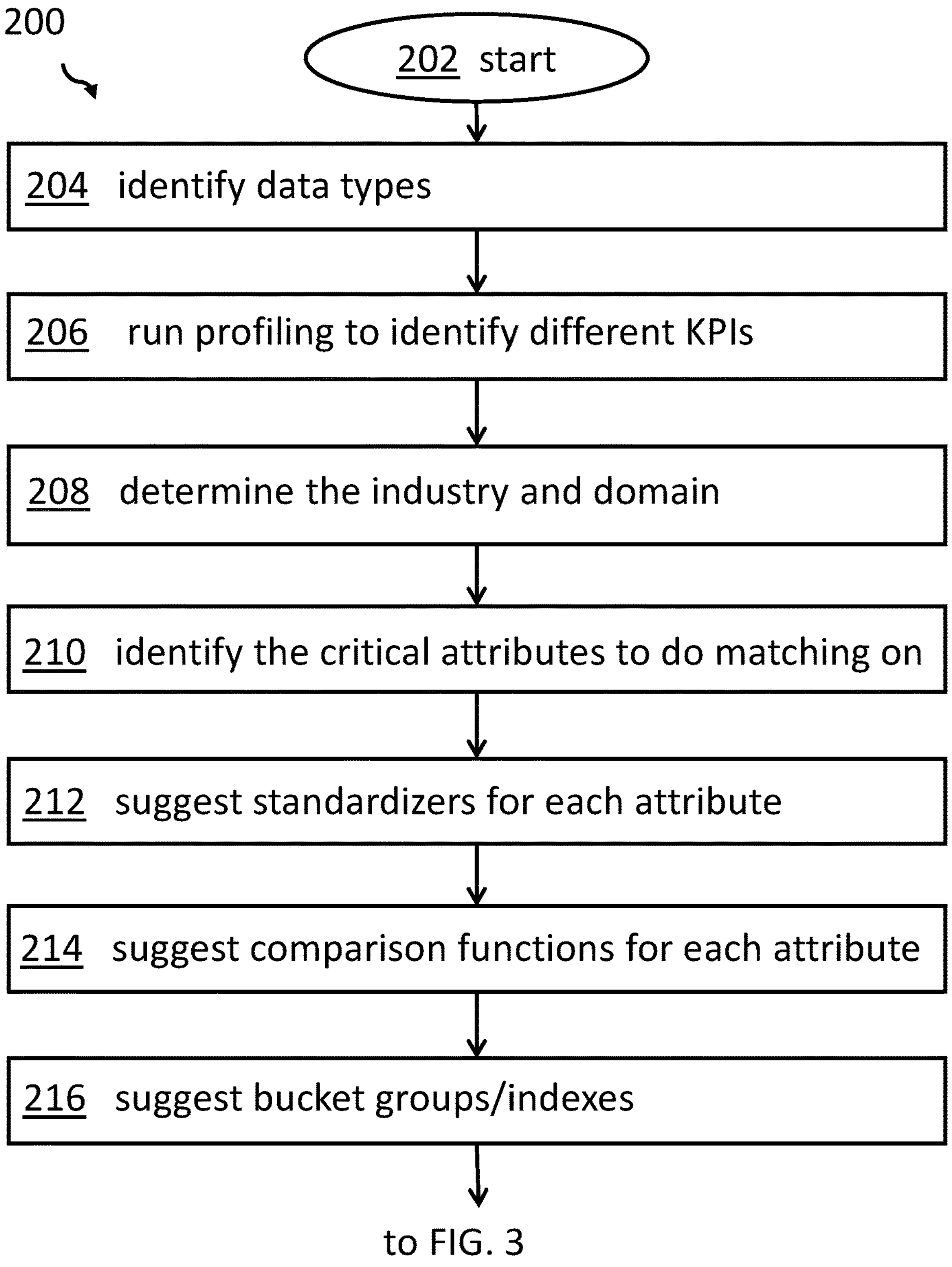
Figure 3:
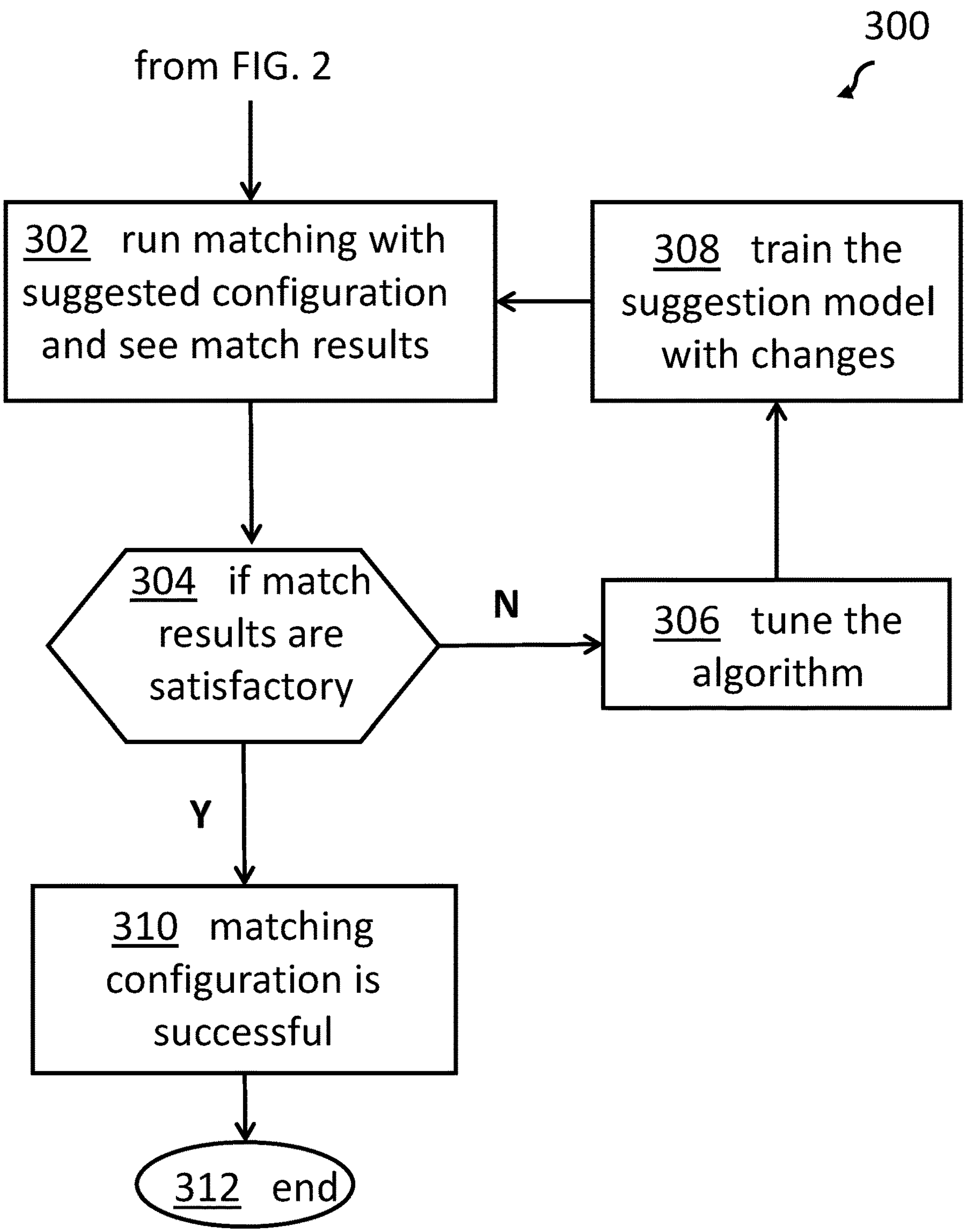
Figure 4:
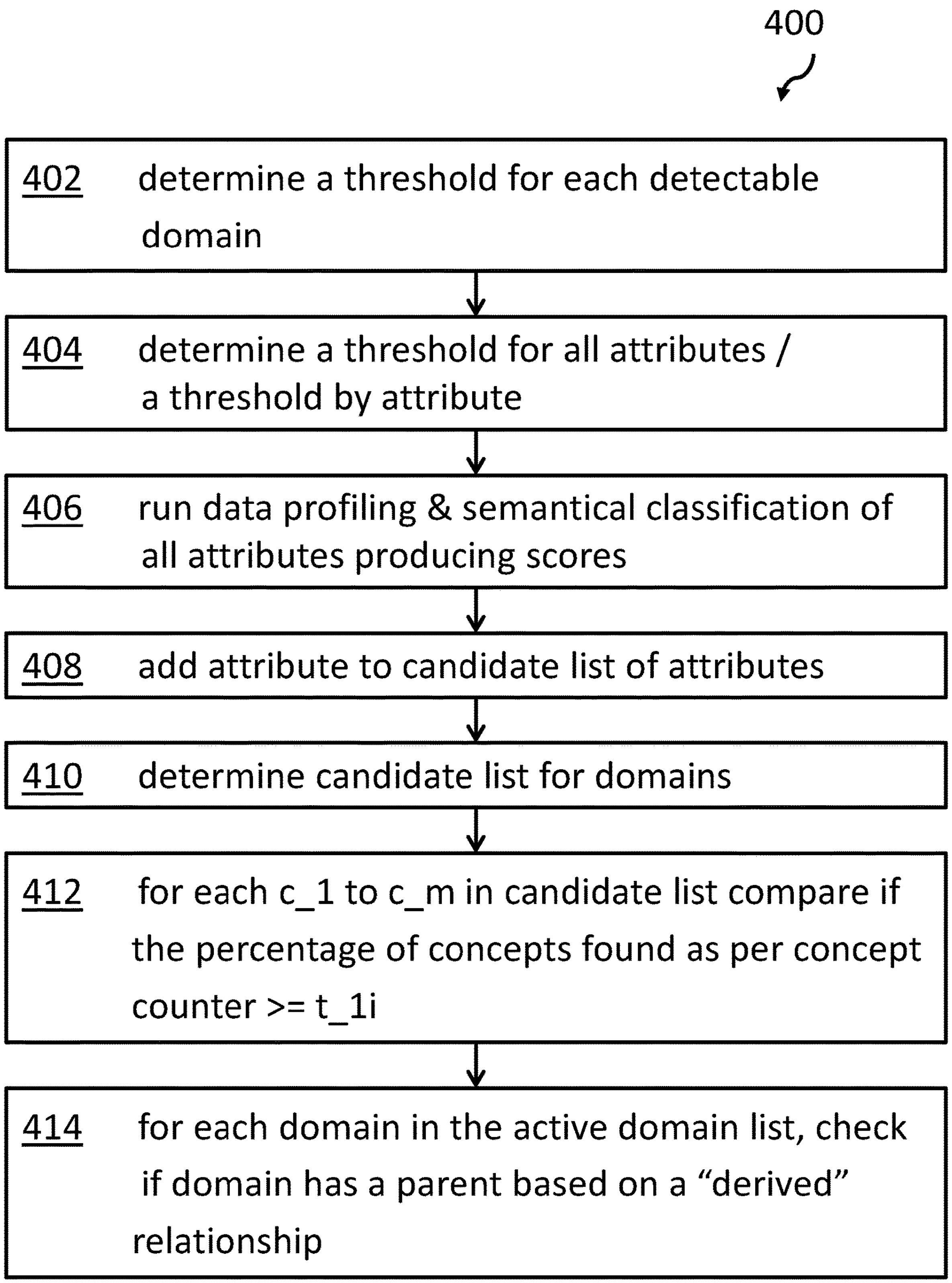
Figure 5:
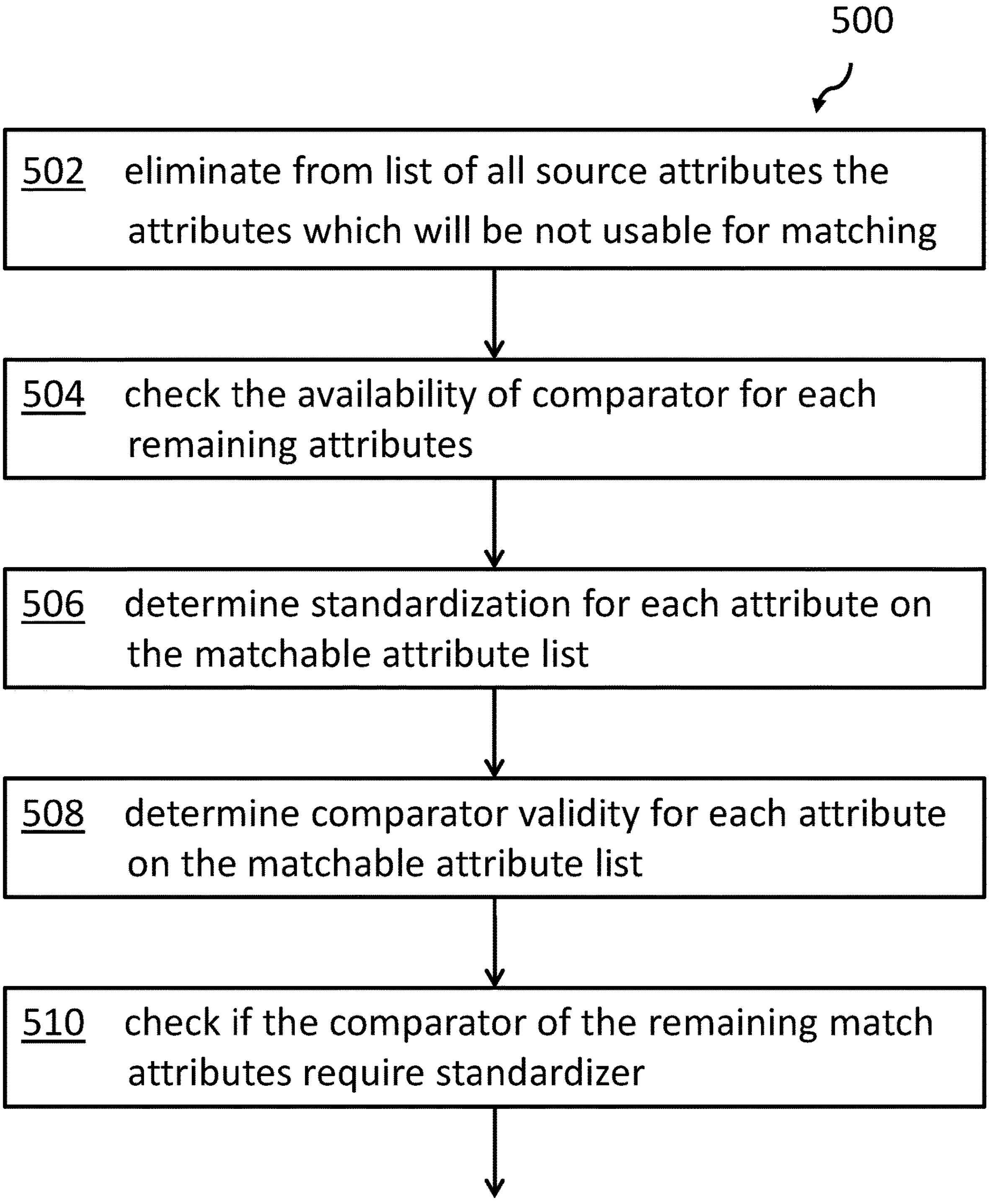
Figure 6:
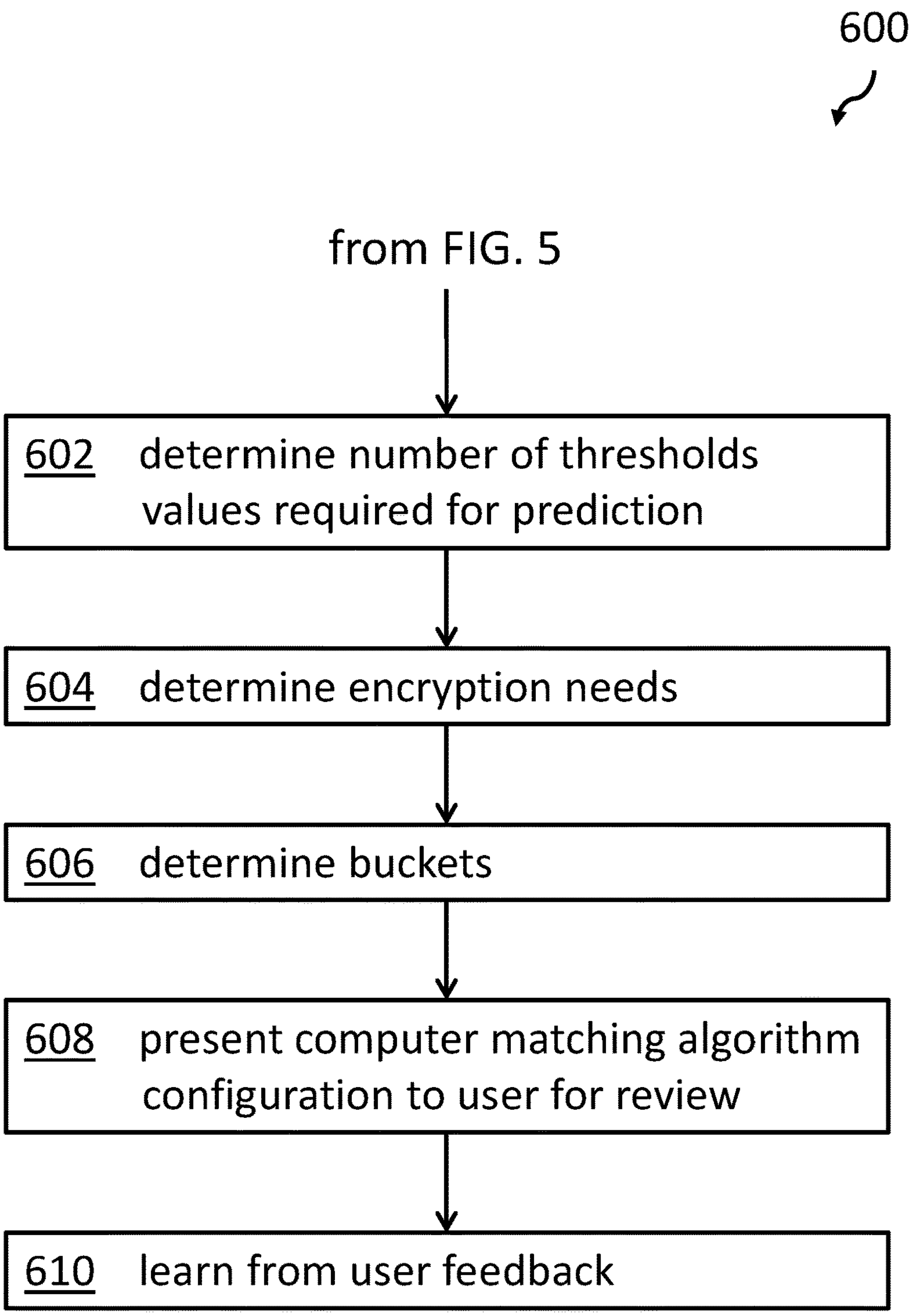
Figure 7:
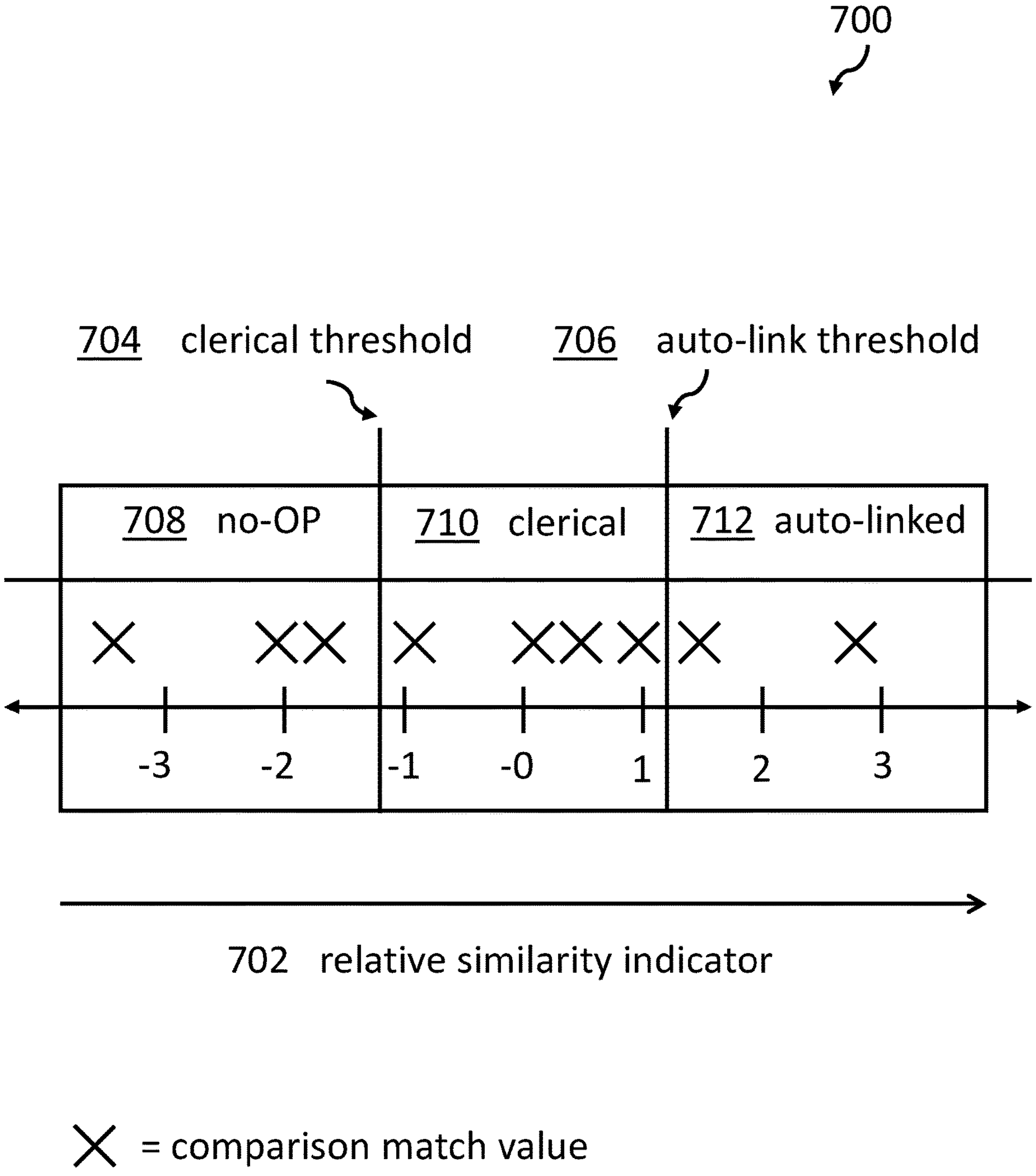
Figure 8:
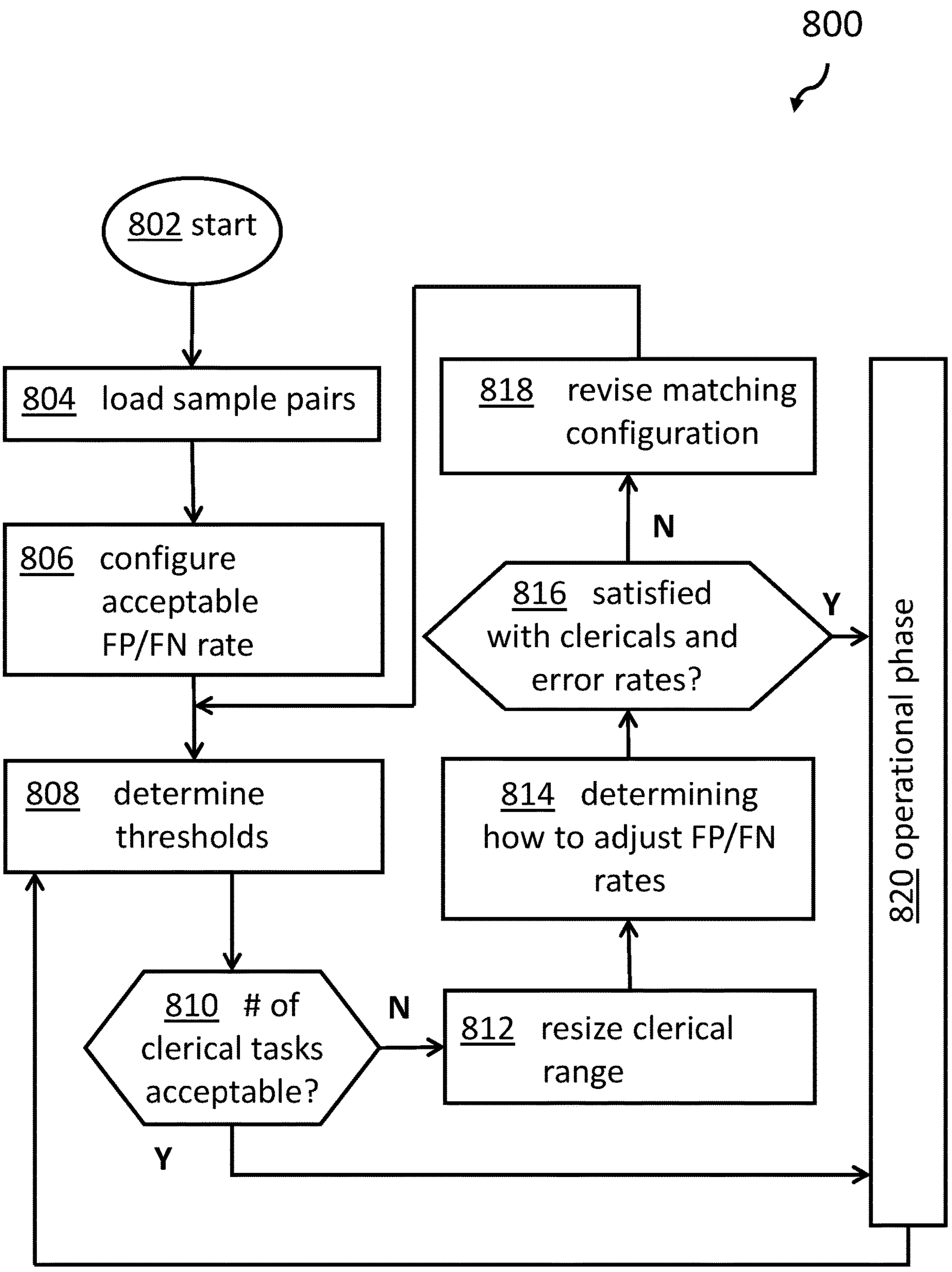
Figure 9:
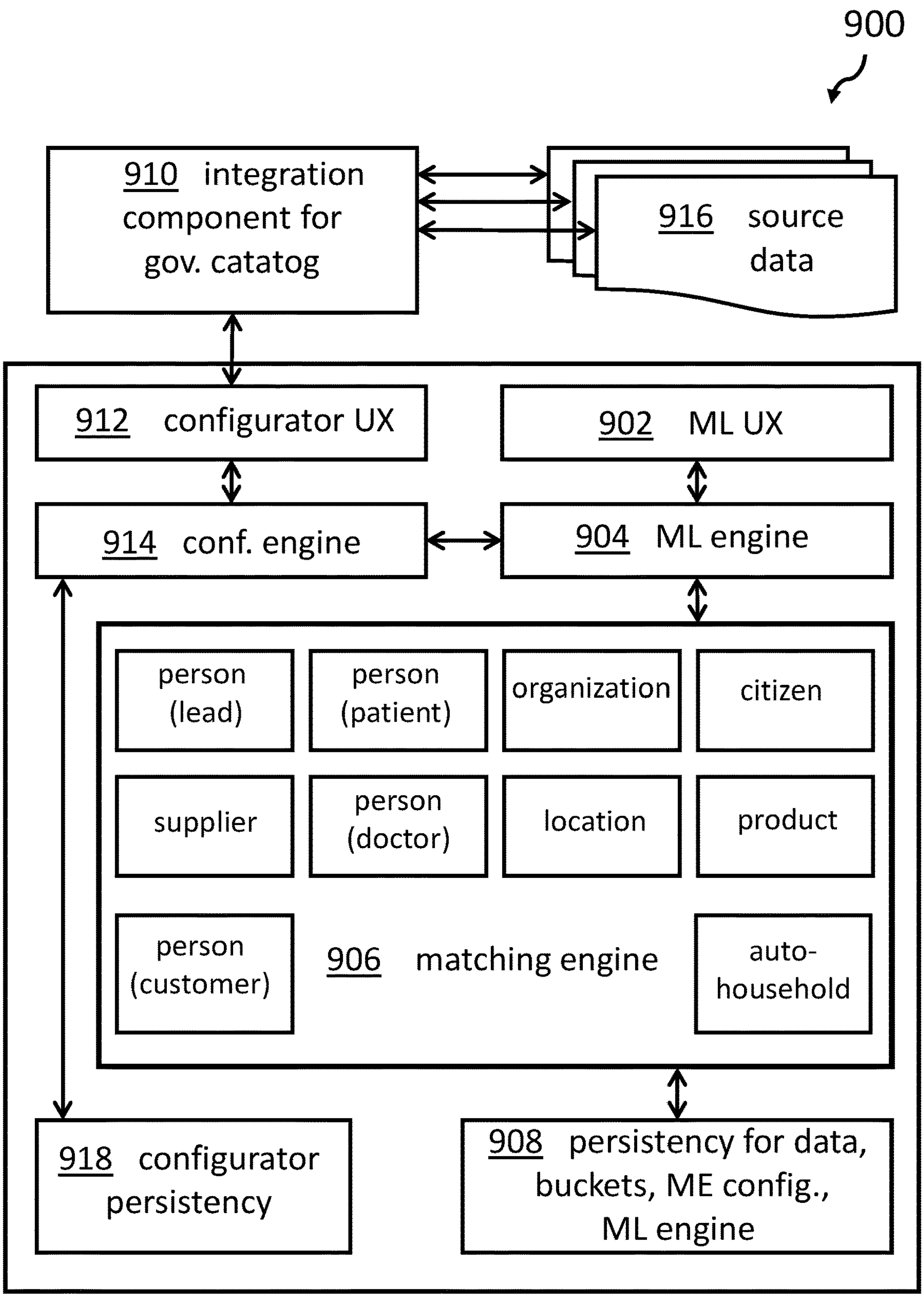
Figure 10:
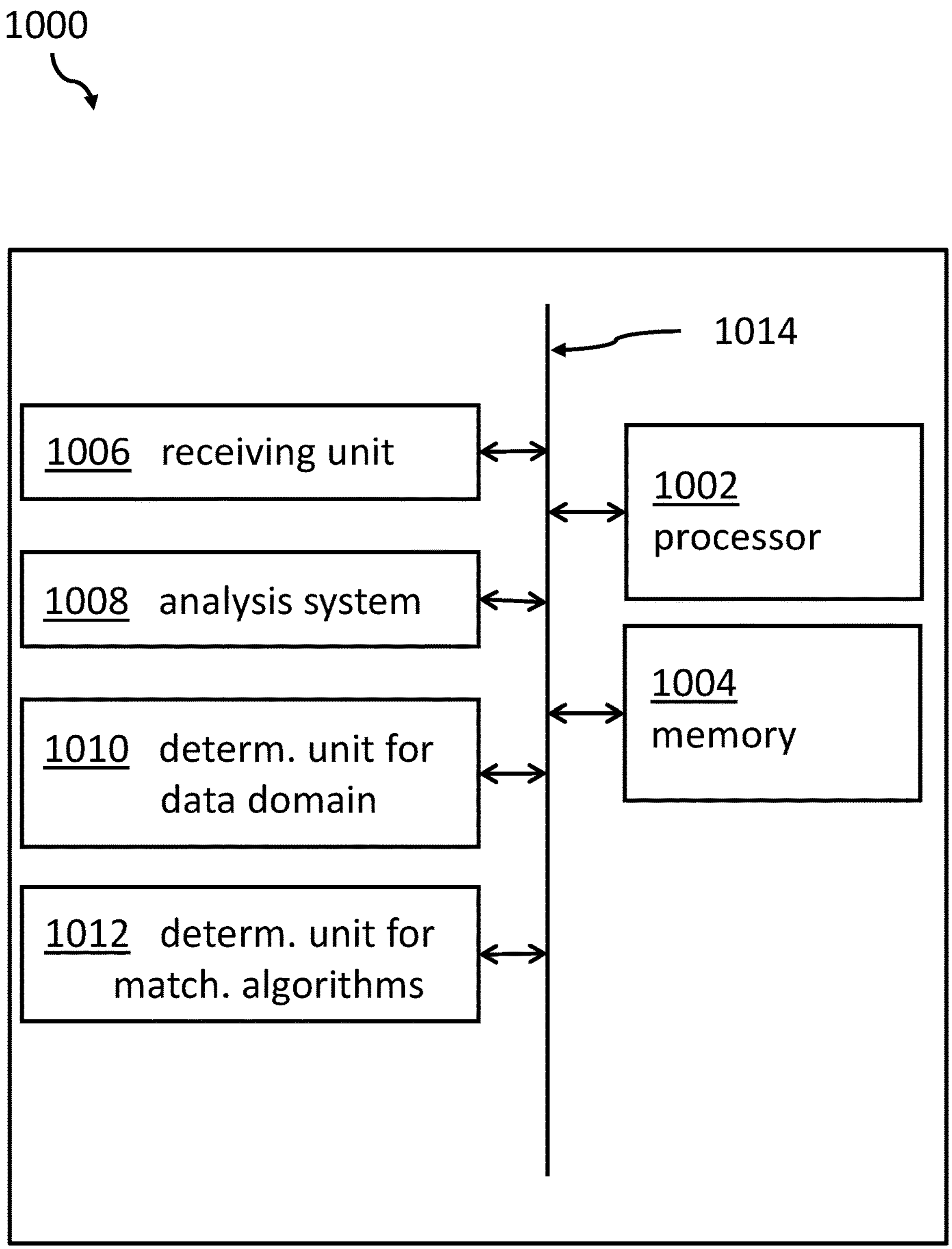
Figure 11:
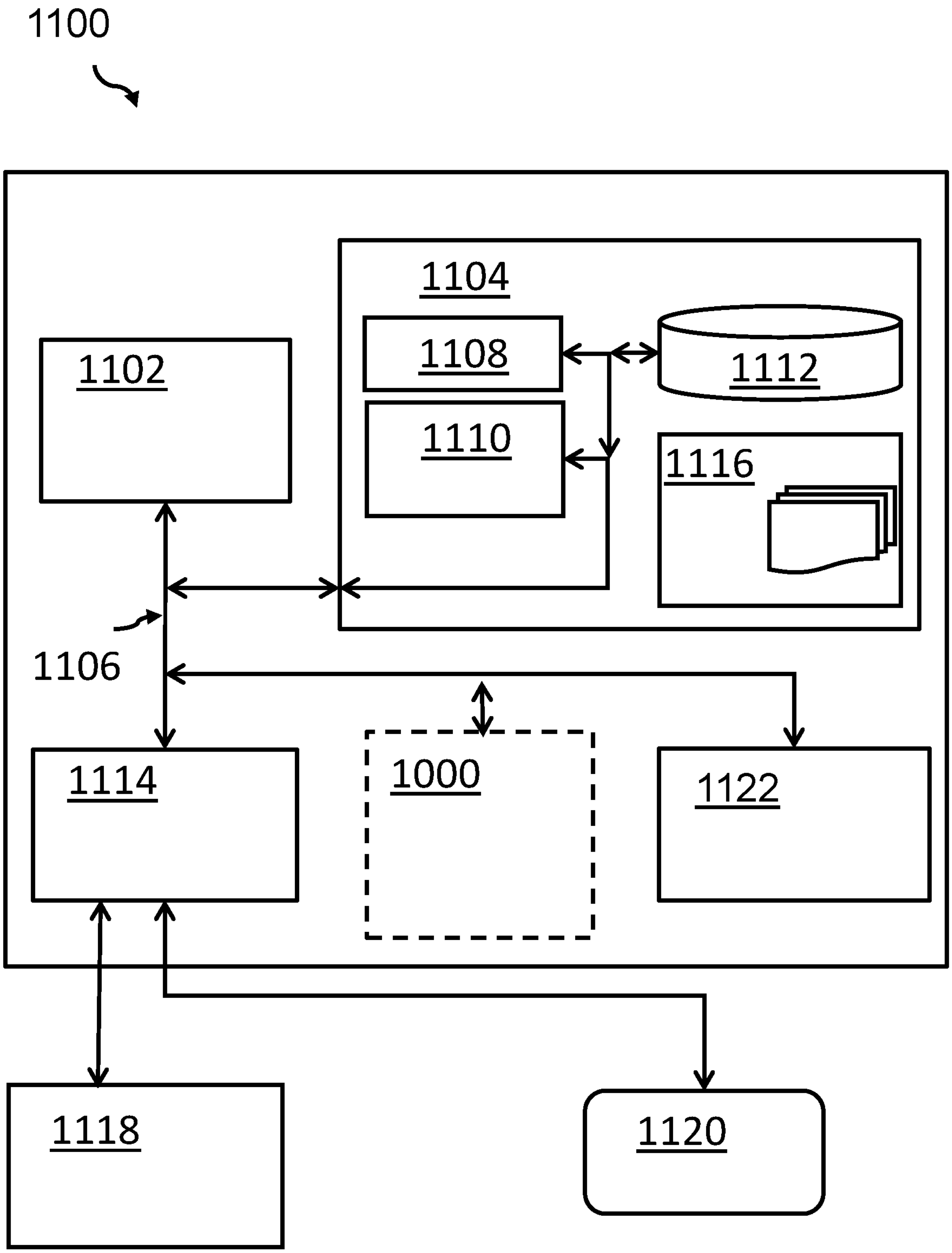

Preferred embodiments of the invention will be described, by way of example only, and with reference to the following drawings:

FIG. 1 shows a block diagram of an embodiment of the inventive computer implemented method for configuring data deduplication;

FIG. 2 shows a first portion of a flowchart of a more complete and more implementation-near embodiment of the proposed concept;

FIG. 3 shows a second portion of the flowchart according to FIG. 2;

FIG. 4 shows a flowchart of steps of an embodiment for suggesting threshold values for detectable domains;

FIG. 5 shows a first portion of a flowchart for suggesting matching features;

FIG. 6 shows a second portion of the flowchart according to FIG. 5;

FIG. 7 illustrates the process of setting a clerical threshold value and an auto-link threshold value;

FIG. 8 shows a flowchart for selecting threshold values for records for which no additional operations may happen, those that may need a clerical supervision and auto-linked records;

FIG. 9 shows a block diagram of a solution architecture into which the new concept can be integrated;

FIG. 10 shows an extended block diagram of the solution architecture of FIG. 9 in which the new components have been integrated; and FIG. 11 shows an embodiment of a computing system comprising the system according to FIG. 10.

DETAILED DESCRIPTION

The invention relates generally to data deduplication, and more specifically, to configuring data deduplication in a master data management system.

In real-world projects, however, it can take five to six months to achieve such data integration. For example, an ETL (extract/load/transform) engineer may extract source data into a staging zone; a data quality expert may run a source data quality analysis together with business users to determine data correction/data cleansing needs; a data architect may review source models and sample data to determine a semantical meaning of source attributes; a data architect may manually perform the mapping from the source to the MDM data model; the ETL engineer may implement and test ETL jobs for a data modeling mapping; a PME (probabilistic matching engine) expert may have to configure the PME using a sample match process; and, once the PME is configured, production load can be executed and the PME can be run in batch mode for initial batch matching results after the load. This represents a heavy workload for the involved experts. Accordingly, embodiments of the present invention recognize that a more automated way of performing data integration using a MDM system may be desirable.

Typically, a system is operable to invoke batch data loading of data associated with one or more source systems associated with the one or more business entities, into an import staging area. The system is further operable to load the data from the input staging area into a master repository and subsequently load the data from the master repository into an output staging area. However, the known documents typically fail to provide a method that may reduce the required time for the above-mentioned data integration projects by a higher degree of automatism for mixing and matching data records of, e.g., different data sources.

Accordingly, embodiments of the present invention further recognize a need to reduce the amount of time required for configuring the matching engine to perform the matching and deduplication task.

The proposed computer implemented method for configuring data deduplication may offer multiple advantages, technical effects, contributions and/or improvements:

The inventive concept may enable a much faster data matching process for data originating from different sources and/or systems in a number of different application fields, like master data management (MDM) projects, complex customer platform integration projects or, also simpler marketing automation or multichannel initiatives. However, the here proposed concept may also be used for product or parts catalogs in a production environment or in the healthcare industry (e.g., identifying and matching patient records). Enterprises perform such tasks because the value of data is increasing continuously, and available information should be used in daily processes and should allow an intuitive usage. This way, enterprise users may be enabled to reflect different business, as well as technical, as well as market dynamics in order to react faster to relevant changes.

Another reason for using data deduplication techniques may be regulatory compliance with regulations such as Anti-Money Laundering (AML) or Know Your Customer (KYC) where it may be necessary to concisely identify clients by removing duplicated data entries and reconciling them to a golden record view. Data privacy regulations such as the General Data Protection Regulation (GDPR) require consent management, the right to review or the right to be forgotten to be handled correctly by organizations handling information of data subjects. To manage consent or allow the execution of the right to review, the data subject also needs to be concisely identified which only works if potentially duplicated records within the same or across systems are detected and appropriately resolved through deduplication capabilities. Non-compliance with some of these regulatory requirements might cause organizations to be exposed to financial fines and hence, there may be a desire to avoid them through compliance using data deduplication techniques.

For this task, data of different types and sources have to be combined with potentially already existing historic data in order to create dynamic records from which it becomes easier to detect new and unexpected insights. The concept proposed here may be used with a plurality of different matching engine types—e.g., probabilistic matching engines, ruled-based/deterministic matching engines and those using advanced artificial intelligence concepts—in order to master the difficulties of data management which have intensified over the last years significantly. The proposed concept is thus be useful in order to master the complexities of big data, cloud hosting, self-service analytics, and tightening regulations. Hence, enterprises and government agencies can—as a result—address one of the top priorities, namely effective data management. The already existing instruments and essential components of data stewardship, and data curation, and data governance are considerably supported with the proposed concept. This all may contribute to a better usage of available resources—in particular, computing time, storage capacity, network capacity—and also reduce the number of tasks that have to be performed manually in the types of projects described above.

In the following, additional embodiments of the inventive concept—applicable for the method as well as for the system—will be described.

According to a useful embodiment, the method may further comprise determining, for each determined required matching algorithm, a mapping—i.e., an association—of attributes of the source data to matching engine algorithm functions. I.e., it may be determined which matching engine functions are to be used for each determined mapping of source data attributes. This may include a selection out of some core configuration variables available for the matching algorithms. Some of them will be described in detail in the described embodiments.

According to a preferred embodiment of the method, the determining which matching engine functions are to be used may comprise at least one selected out of the group consisting of (i) determining at least one standardizer—in particular, nicknames for names mapping, etc., which is typically not possible for all attributes—considering a plurality of source data attributes (i.e., dimensions), (ii) determining at least one comparison function considering a plurality of source data attributes, i.e., dimensions, and (iii) determining bucket groups—in particular those comprising deduplication candidates—of source data records. The reason for the latter may be to optimize the size of the bucket. This may lead to a performance increase (e.g., sub-second response time for the matching algorithm) by high probability to find matches. Thereby the size of the group may be in the range of about 200 to 500 records. The size could also be smaller for more seldom attributes like the name "Skiskibowski" in Paris or, it could be larger—e.g., for the name "Smith" in London. However, one may also use to subdivide too large buckets using different ZIP codes (or other dividing selection options) if the key attribute is the name.

It shall also be mentioned that the at least one comparison function may be based on e.g., an edit distance comparison, a culture name resolution and/or phonetic comparison.

According to an advanced embodiment of the method, the determining at least one data domain may comprise also at least one selected out of the group consisting of (i) configuring, for each detectable data domain, a domain detection threshold value for the data matching engine. Thereby, the domain detection threshold value should be indicative of a domain being detected as a separate domain. Hence, if the probability for the determined domain is below a predefined threshold value—i.e., the domain detection threshold value—the specific attribute and/or record may not be considered to belong to the domain in question.

Furthermore, the determining at least one data domain may also comprise (ii) configuring a sub-class threshold value for a detection of the domain. Thereby, the sub-class threshold value may be indicative of a minimum number of detected sub-classes in records of source data.

Additionally, the determining at least one data domain may also comprise (iii) determining a confidence threshold value indicative of an average value of confidence values of detected sub-classes to determine a detected class. Such statistical data may be derived determined during the analysis step, i.e., during the initial data classification process.

According to a further interesting embodiment, the method may also comprise determining a detected data domain if the required matching algorithm of the data matching engine may have to be configured, and with it, configuring the required algorithm. The details of this process may be configured and controlled by the related user interface. However, the less configuration options need to be considered manually, the faster the deduplication may be performed.

Hence, in order to determine a domain, it may therefore be necessary to determine an intersection of the data classes of the classified attributes for terms or entries in an ontology graph. Key parameters may comprise how many properties need to be present. If properties may belong to more than one domain, only the one with the most properties may be suggested, or both if have found enough properties, and so on.

According to another preferred embodiment, the method may comprise configuring an auto-link threshold value (AL) depending on detected false positives and/or false negatives results of the matching of records, and configuring a clerical review rate threshold value (CR) depending on a number of clerical tasks to be performed. The relationship of AL and CR values may be of critical nature for the number of records requiring a clerical review. The less clerical reviews, the faster the deduplication process may be executed. Furthermore, less data specialists may be required for the manual reviews and assessments of the records lying in-between the auto-link threshold value and the clerical review rate threshold value.

According to a further advantageous embodiment, the method may also comprise determining two records to be duplicates (i.e., duplicate records) if their combined matching score value may be greater than the auto-link threshold value. This may assume that two records that compare with score values above the AL threshold may be considered to refer to the same physical person or, more general, the same physical entity and may automatically be merged (auto-linked) to one record.

In contrast and according to another advantageous embodiment, the method may also comprise determining two records to be no duplicates if their combined matching score value is smaller than the clerical review rate threshold value.

According to another embodiment, the method may also comprise determining two records to be assessed clerically if the two records are not determined to be duplicates and if the two records are not determined to be no duplicates. This may be another comparison trigger for a clerical review tasks which may need to be handled by a data steward. These parameter configuration parameter values may also be required for the configuration UI (user interface).

According to an enhanced embodiment of the method, the data profiling statistics and a classification of the source data may result in at least one of the following (i) technical metadata of the received source data, (ii) data quality metric values per attribute of the source data, (iii) relationship descriptors between sets (e.g., tables) of the source data, and (iv) a data classification per attribute, and thereby potentially a linkage of the attributes and their relationships.

According to possible embodiments of the method, the data matching engine may be a probabilistic data matching engine, a machine-learning based data matching engine or a deterministic data matching engine. Hence, the concept proposed here may be implemented together with various matching engine approaches.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

In the context of this description, the following conventions, terms and/or expressions may be used:

The term 'data deduplication' may denote any technique allowing an elimination duplicate copies in a data set, e.g., here, in the source data. Thereby, it may not be necessary that two records are completely bitwise identical. However, the technique applied here may analyze a plurality of records from the source data in order to determine whether two records, which are not 100% identical, may relate to the same entity and the real world, and potentially match or adjust the content of the record in order to build only one resulting record.

The term 'source data' may denote any data describing entities in the real physical world. The organization of the data may only be of second interest. However, the source data may come in form of one or multiple data sources from potentially different origins and may be organized, e.g., in record form, in table form, from e.g., a relational database (or another type of database), a linked list, a flat file, as HTML documents, just to name a few.

The term 'data profiling statistics' may denote a process of determining information about the data entities in the source data. This may be performed by a metadata discovery component in order to determine technical metadata of the involved data models. Additionally, data quality metrics per attribute of the source data may be determined by a data quality analysis component, whereas relationships between tables (or otherwise organized data) may be determined by a data quality analysis component. During the process of determining the data profiling statistics, also data classification per attribute—in particular by a data classification component—and hence a linkage of the attributes to data classes may be determined.

The term 'classification of an attribute' may denote relating a found attribute value or the attribute itself to a specific class. This may be performed by a trained machine-learning model.

The term 'data domain' may denote loosely the content and context area in the physical world to which the data belong. This information may be determined by using a business glossary, i.e., ontology or ontology graph. The domain may, e.g., relate to a specific industry, to a specific part of an industry (e.g., logistics, computer industry, computer architecture, addressed data, order data, network description and component data, etc.) or to other real world concepts, like healthcare data, customer data, etc.

The term 'ontology data' may denote here, a catalog of terms and entities symbolizing (or abstracting) real-world entities. They may be grouped, organized in hierarchies and categorized. Commonly proposed categories may include substances, properties, relations, states of affairs and events. One example may be a master data management catalog to organize and relate to each other computing, storage and network components as well as user data in a data center.

The term 'matching algorithm' may denote a schema allowing for comparing attributes of a record and determine whether two records may relate to the same physical entity, and thus, whether they may be merged or whether one of them may be eliminated. In other word: a matching algorithm may be implemented as a software program executing on a set of attribute operations like standardize, compare, bucket, aggregate weights from attributes to total score, compare that score against the lower (non-match/clerical) and upper (clerical/auto-link) threshold and—optionally, if the total score is above an auto-link value—executive automatic survivorship rules.

The term 'data matching engine' may denote a system allowing and being enabled to execute the matching algorithm.

The term 'mapping of attributes' may denote an alignment of attributes of a source records to attributes of a target record. Hence, it may denote a mapping of data models, not specific values.

The term 'matching engine algorithm function' may denote—in a scoring system which may be machine having learning based and/or be a probabilistic matching engine—a determination component that may take as input to records (e.g., person records) and may output a numerical value describing their similarity. The higher this value may be, the more similar are the two records.

The term 'standardizer' may denote a function or a system enabled to standardize data before a comparison function may be applied. This standardization may be performed according to predefined rules.

The term 'comparison function' may denote the above-mentioned matching engine algorithm function.

The term 'bucket group' may denote a group of records to be compared and to determine duplicate entries. The size of the bucket group—i.e., the number of records included—may have a significant influence on the overall performance of the system. Typically, bucket groups sizes may be between 200 and 500 records. However, technically, also any other bucket size is possible. Additionally, it shall be mentioned that the term 'record' may denote the context of this document for any organization of the source data. The term may not be interpreted only as a linear sequence of data fields—i.e., attribute values—but in a more general sense of a plurality of attribute values that may be organized in more or less any form.

The term 'domain detection threshold value' may denote a numerical value against which a confidence classification value of a domain detection component may be compared in order to determine that the source data may belong to a certain industry domain.

The term 'confidence threshold value' may relate a probability value known as output value from a machine-learning system, wherein the confidence value may be indicative of the probability that an input value may be classified into a certain class. Hence, the class confidence value of the inference of the machine-learning system may be used (or not be used) depending on the relationship between the actual confidence value in comparison to the confidence threshold value.

The term 'combined matching score value' may denote a numerical value describing the chance of probability that two records have been determined to relate to the same physical entity.

The term 'auto-link' (AL) may denote the process that two records are determined to relate to the same physical entity, i.e., that they shall be merged and one of the two records be eliminated.

The term 'auto-link threshold value' may denote a numerical value above which two records may be determined to relate to the same physical entity if their combined matching score value is larger than the auto-link threshold value.

The term 'clerical review' (CR) may relate to the fact that all the entire underlying application system may not be certain about the fact that two records may relate to the same physical entity and that the manual assessment by a user, e.g., data scientists, data stewards, or domain experts shall be made.

The term 'clerical review rate threshold value' may denote a numerical value and may separate ranges of the combined matching score value categorizing record pairs to be analyzed manually.

Hence, in a nutshell, auto-link (AL) and clerical review (CR) threshold values may be treated in the following way: Two records that compare with comparison scores above the AL threshold value may be considered to refer to the same physical entity, e.g., the same person, and may be automatically merged (linked) to one record. Two records that may compare with score values below the CR threshold value may be different and may be kept separate. All other comparisons may trigger a clerical review task and may need to be reviewed by a data steward.

The term 'machine-learning based data matching engine' may denote a system using known techniques from the area of machine-learning—in particular, using training data to train a machine-learning system in order to predict output values based on unknown input data—in order to perform tasks in the context of data deduplication, in particular, in the process of determining that two records relate to the same physical entity. Such system may also be denoted as probabilistic matching engine.

The term 'deterministic data matching engine' may denote an alternative approach if compared to a probabilistic matching engine (PME). In the case of a deterministic data matching engine, decision tree approaches or other procedural concepts may be used in order to support the matching and deduplication process.

The term 'false positive' may denote in a determination process that the term may possibly be determined to belong to a certain category although the term does not belong to the category. The same may apply for the term 'false negative'. Both terms may be well known from statistical methods.

In the following, a detailed description of the figures will be given. All instructions in the figures are schematic. Firstly, a block diagram of an embodiment of the inventive computer implemented method for configuring data deduplication is given. Afterwards, further embodiments, as well as embodiments of the deduplication system for configuring data deduplication will be described.

FIG. 1 shows a block diagram of a preferred embodiment of the computer implemented method 100 for configuring data deduplication. The method comprises receiving, at 102, source data, which may comprise structured data records in the form of e.g., flat file(s), a multiple JSON documents, relational database tables, or others.

The method 100 comprises analyzing, at 104, the received source data, wherein analyzing the source data includes generating data profiling statistics and classifying attributes of the source data. In an embodiment, receiving source data results in information about which mapping to other data can be useful and it may use support from an existing MDM (master data management) or catalog or already existing ontology, and so on. In an embodiment, the method analyzes and classifies the source data attribute by attribute to determine metadata such as quality, data classes, with respect to the present data structure, data quality, uniqueness of attributes, consistency within the data, inner logic between and across attributes, etc.

The method 100 comprises determining, at 106, at least one data domain (e.g., attribute elements, attributes groups, etc.) associated with the source data using the profiling statistics and the classification and ontology data. In an embodiment, an ontology is provided externally, e.g., from an existing data governance catalog or similar. In an embodiment, for a given data domain, an intersection of the data classes of the source data with an ontology graph is determined.

Additionally, the method 100 comprises determining, at 108, for each determined data domain, a number of required matching algorithms for a data matching engine to execute data deduplication within the received source data. As an example, a household shall be mentioned, e.g., different persons having as common attributes the same last name and the same address, i.e., same street name, same ZIP codes, and same city name and country. Cases of special interest comprise twins where only the first name may be different because they have the same dates of birth.

FIG. 2 shows a first portion of a flowchart 200 of a an embodiment of the present invention. After the start of the process at 202 and after new source data has been received, data types are identified, at 204, in the received source data. An analysis and profiling step 206 is performed to identify different KPIs (key performance indicators) or better indicators allowing to determine, at 208, the industry that the newly received source data may belong to, and/or a domain (i.e., at least one) using a business glossary or enterprise term dictionary. A key performance indicator evaluates the success of an organization or of a particular activity in which it engages.

In a next step, critical attributes of the source data are identified at 210, according to which the matching process between different records of the source data should be executed. Based on this, the underlying system may then suggest, at 212, a standardizer for as many attributes as required and may also suggest, at 214, a comparison function for as many attributes as required (i.e., one function per attribute). Furthermore, the underlying system (or the related method) may suggest, at 216, bucket groups or indexes according to which the records of the received source data may be grouped for further processing, e.g., deduplication. This step is useful for performance reasons. Experimentally, it could be shown that groups of 200 to 500 records of the source data to be processed may result in an overall optimized performance. This process flow is continued in FIG. 3.

FIG. 3 shows a second portion 300 of the flowchart according to FIG. 2. Here, the matching process at 302 is executed with a suggested configuration and the matching results between records of the source data can be assessed either automatically or supported by a data steward. If the results of the matching process are satisfactory in the determination at 304—case "Y"—the matching configuration is successful, and the planned deduplication may be performed. Otherwise, the results may be used for alternative data management activities like in a data governance project or process, in a customer relationship management (CRM) or customer data platform (e.g., for marketing automation purposes), and so on.

If the determination at 304 is not satisfactory—case "N"—the selected algorithm and its parameters is tuned again at 306 and the suggestion model is trained with the change as determined in 306. Then, the matching process at 310 is executed again. The flow of actions ends at 312.

FIG. 4 shows a flowchart 400 of steps of an embodiment for suggesting threshold values for detectable domains. This partial step may best be understood in the underlying sequence of activities, namely: (i) preprocessing for analyzing a classification of data; (ii) determining the number of data domains and the number of algorithms required (to be discussed in more detail below in the context of FIG. 4); (iii) determining a mapping of source attributes to match engine features with required algorithm(s); (iv) determining per map source attributes which matching engine functions shall be used; (v) determining weights for the algorithms; (vi) determining threshold values for the matching; (vii) determining whether encryption features of the matching engine should be turned on; (viii) determining if, e.g., a corresponding household algorithm is applicable (in case of address data and a plurality of people living in one household); and (ix) deploying the configured matching algorithms.

After the step of profiling and classification of the source data, the following information may be available: technical metadata of the input data models (performed by a metadata discovery component), data quality metric values per attribute (from a data quality analysis component), relationships between data of tables (in case of a database) (identified by a data quality analysis component), a data classification attribute of the source data (performed by a data classification component) and hence a linkage of the attribute to data classes. Support for this process comes from an ontology graph in, e.g., a data governance catalog, so that one can derive a basic structure of master data entities and their relationships regarding the source data.

In order to determine a domain within the source data, one needs to determine an intersection of the identified data classes and the identified classified attributes to the ontology graph, as discussed now. The key parameters for this are (i) how many properties need to be present, and (ii) if properties belong to more than one domain, does only the one domain with the most properties get suggested, or both if they both have enough properties found, and so on.

In more detail, firstly, a threshold t_11, . . . , t_1*n* is determined, at 402, (and configured) for each detectable domain d_1, . . . , d_n. This threshold value indicates which percentage of the "has"/"subtype" concepts attached to a node with an "is" relationship to the "matchable" node must be found to detect a domain. In an alternate embodiment, instead of the "matchable" node and a relationship to it being existent, the root node for a domain could contain a property if this domain is matchable or not.

Then, a threshold q_t for all attributes/a threshold by attribute q_t1, . . . , q_tn is determined (and configured), 404, for an attribute activation. Next, a data profiling and semantical classification of all attributes is executed, 406, (i.e., "run") producing scores p_1, . . . , p_n guessing the domain of the attribute. In an embodiment, the scores p_i are affected by semantical classification techniques and data quality results. In an embodiment, this is a weighted measure. In an embodiment, the attribute is added, at 408, to the candidate list of attributes if p_i>=q_t (or q_ti).

In an embodiment, a list for domains c_1, . . . , c_m is determined, 410, by: (a) for each attribute find the first parent node having an "is" relationship to the node "matchable" only traversing "has" or "subtype" edges; (b) insert a new entry in candidate list if the parent node is not in the candidate list and set concept counter to 1; and (c) otherwise for existing parent node in candidate list, increase concept counter by 1.

In an embodiment, each c_1 to c_m in the candidate list is compared, 412, if the percentage of concepts found as per concept counter >=t_1*i*. If that is the case, the domain is activated and added to an active domain list.

In an embodiment, for each domain in the active domain list, it is checked, at 414, if the domain has a parent based on a "derived" relationship. If that is the case, it is checked if all attributes indicated by the "depends" relationship are found. In case of that being true, the domain is activated.

These procedural steps are instrumental for a proper detection of a domain in the source data. Thereby, in some cases it may be helpful to activate an algorithm for a household, e.g., if different entities (i.e., people's last names) AP and the source data have the same address. In an embodiment it may be useful to activate an algorithm for a generic or specific organization type in order to identify entities within identical organization structures, like, a department FIG. 5 shows a first portion 500 of a flowchart for suggesting matching features. In the same context as described under FIG. 4, here, the step (iv) "determining per map source attributes which matching engine functions shall be used" is described here. It is assumed that "a feature" for matching is a single or multiple attributes, e.g., DoB (date of birth as a single attribute) or address (consisting of multiple attributes). It should also be assumed that the matching engine functions at least comprise standardizers and are able to standardize data in the form before applying the comparison functions; comparators are used to actually compare the respective data, e.g., using mechanisms such as edit distance, phonetic factors, nickname resolution, GNM (i.e., global name management), and so on. Furthermore, the matching engine may—last but not least—comprise a bucketing function. For efficiency reasons, one cannot compare every record of the source data with all other records of the source data of millions of records. Hence, in an embodiment, the bucketing function includes a small subset, for which a real chance exists for matching. In an embodiment, bucketing is done which essentially means that the data are clustered into buckets of ideally at most 200 to 500 records.

In an embodiment, the input for this step of an implementation-near solution would be a list of all source attributes with data profiling results and related data quality scores, as well as a further semantical classification, which means a mapping of the source attribute to data classes. Furthermore, a list of detected domains for which a matching algorithm may be configured is used as input data, as well as a list of all matching features, namely, standardize use with mapping to applicable data classes, comparators with mapping to applicable data classes and, bucketing constraints.

The output of this process step is a configuration proposal to be displayed to a human user for all detected domains for which a matching algorithm is required. The output can cover the suggested standardizers, the suggested comparators and the suggested buckets.

In detail, this sub-process works in detail as follows: firstly, removing (i.e., eliminating), at 502, from the list of all source attributes those attributes which will be not usable for matching, i.e., (i) remove all attributes where the completeness score from profiling is below a configurable, mandatory completeness score (e.g., below 5%), because very sparsely populated columns do not contribute much to match decisions; (ii) remove all attributes where the distinct value score from profiling is below a configurable, mandatory distinctiveness score (e.g., below 1%, because columns like gender with typically only 2 values usually have very little or no weight influencing a matching decision); and (iii) remove all attributes where the last modified timestamp is older than a configurable, mandatory currency threshold score (e.g., older than 5 years, because attributes that have not been updated for a long time are likely to be outdated and should be ignored).

Secondly, for each remaining attribute, it is checked, at 504, based on the data class, whether there is at least one applicable comparator with the same data class support available (ideally, names should be compared with tailored comparators for names). If that is the case, the attribute is added to the list of matchable attributes. If that is not the case, it is checked, based on the data type of the attribute, whether there is a suitable generic comparator possible (e.g., NGRAM for string data type). Again, if that is the case, the attribute is added to the list of matchable attributes.

Then, for each attribute on the list of matchable attributes standardization needs are determined, at 506, by two approaches: (a) optimization problem implementation and/or (b) a rule-based implementation by looking, per attribute, at data quality metrics like format compliance, domain compliance, etc., and turning on standardization if a median value across data quality metric values is below configurable threshold (e.g., below 70%).

As a fourth step in this partial process, for each attribute on the list of matchable attributes, the comparator's validity is determined, at 508, in the following way: either, for attributes with only 1 comparator attached, the comparator is activated, or, for attributes with multiple comparators attached, a comparator validity check is executed by the following detailed steps:

(i) if data profiling revealed multi-byte data in an attribute, single byte comparators are removed;
(ii) if data profiling revealed geographic value distribution, country/locale specific comparators are removed (e.g., address comparators by country)—more rules could be applicable;
(iii) after an execution of the comparator validity checks, the following is executed:
  (iii)-1: if the attribute has more than one valid comparator attached anymore—the attribute is removed from the list of matchable attributes;
  (iii)-2: if the attribute has only one valid comparator left, the comparator is activated,
  (iii)-3: else the attribute for a cost analysis as marked.

In embodiments where the number of attributes marked for cost analysis is larger than zero, the cost analysis is executed using two approaches:

(i) an optimization problem implementation, or
(ii) a rule-based implementation by (i) configurable threshold values of how many matching attributes can pick the highest cost comparators, and (ii) based on geographic spread threshold values, consider higher cost functions. This concludes the fourth sub-step 508.

In a fifth process step, it is checked, at 510, for the remaining matching attributes with assigned comparators, whether the comparators require standardizers or whether they can handle with data quality problems autonomously. If they can handle with data quality problems, all standardizers, not required from the standardizer list, are deactivated. This process description is continued in FIG. 6.

FIG. 6 shows a second portion 600 of the flowchart according to FIG. 5. Next in the process flow, it is determined, at 602, if the matching is a binary or a multi-category decision to determine the number of thresholds required for prediction. This can be implemented in different ways, e.g.: if the list of matching attributes at this stage has only two attributes it is more likely to configure threshold for a binary decision as there is no point in multi-category decision (not much for stewards to look at).

As seventh step, it is determined, at 604, whether encryption/decryption needs to be activated by assessing which data classes of source attributes have privacy/security policies attached to them. This can be implemented in different ways, e.g., by a determination whether at least one attribute is marked requiring protection; then, everything is encrypted. In an embodiment, only those data fields are encrypted which are marked requiring protection.

As an additional step, the buckets and their bucket sizes are determined, at 606. This is performed in the following way:

1. at a minimum: 1 bucket is defined;
2. the candidate list is a "Union All" of the entries found in the buckets if multiple buckets are used; ideally—one uses 2 to 5 bucketing strategies (fishing with different sizes in the "fishing net");
3. of the source attributes, only those attributes are taken into account that are above a configurable minimum distinct value score (attributes with low distinct value ratio create too large buckets);
4. while the list of buckets 0 is larger than the number of buckets found and smaller than 6 the following is repeated for qualifying attributes:
   (a) an average/median frequency distribution per unique distinct value: if average/median is outside the 200-500 range—the attribute is disregard;
   (b) otherwise, the frequency distribution is sorted per unique distinct value descending—the x % most frequent distinct values are analyzed using configurable threshold values; if a configurable percentage y % from the x % of most frequent distinct values is above a 5000 frequency (or another upper configurable number), another column with a low correlation value score is added (a high correlation means: att1=x then att2=y in >50% of the cases; a low correlation means that correlation exists <50%, which is known from the earlier column dependency profiling) and go to step 4.(a) 1 "an average/medium" analysis again.

Furthermore, a ninth process step could optionally be to present, at 608, the matching algorithm configuration(s) to a user or an operator to determine whether a data steward may be required for review and/or refinement.

Finally, as additional optional step, the process may be adapted to learn, at 610, from user feedback (like adjusting parameters, etc.).

FIG. 8 shows a flowchart 800 for selecting threshold values for records for which no additional operations happen, those that need a clerical supervision and auto-linked records. In the same context as described under FIG. 4, here, the step (vi) "determining threshold values for the matching" will be described.

As a general task to be addressed in this process step, the following may be considered: Threshold configuration values are determined for a number of false positives (FP)/false negatives (FN) in those cases requiring clerical support (clerical). These three threshold groups, separated by two threshold values, are in opposition to each other. By increasing the clerical threshold value, the number of clerical tasks is reduced. But in this increases the number of falsely classified records to which no operations (no-ops) are applied. By decreasing the clerical threshold value, the number of falsely classified no-ops is reduced, but the number of clerical tasks is increased.

Furthermore, by increasing the auto-link threshold value, the number of falsely classified auto-links is reduced. However, the number of clerical tasks is again increased. Finally, by decreasing the auto-link threshold value, the number of clerical tasks is reduced. However, this may increase the number of falsely classified auto-links.

Due to these conflicts, it may be difficult to find threshold values that always yield the correct result. This may be the case if the clerical range is zero, while no false positive/negatives occur. Therefore, users need to compromise and find the best trade-off between the amount of clerical tasks and the false positives/negatives.

Another aspect of this problem is that the threshold values can differ among multiple entity and task types. One example are "leads" (i.e., prospect customers). These are records of potential customers that often contain very sparse data. In a matching process, they are often not considered for clerical review because there is not enough data. For such tasks, the clerical and auto-link threshold values should be same. This eliminates the clerical range entirely; in other situations (e.g., the VIP—very important—customers), the clerical range might be increased due to the high importance of correct matches for these kinds of records.

These dependencies become apparent in the context of FIG. 7 which shows a diagram 700 with three areas of matching operations: no-op, clerical, auto-linked. The x-axis represents a relative similarity indicator 702. The "X" symbols indicate records with a certain relative similarity indicator value. Additionally, the clerical threshold value 704 separates those records being in the group for no-ops from the one in the clerical group, whereas for the auto-link threshold value 706 separates those records being in the clerical group 710 and to the auto-linked group 712. It becomes comprehensible that a movement of the clerical threshold value 704 to the right would increase the number of FP/FN in the no-op group 708. The same would apply if the auto-link threshold value 706 would be moved more to the left.

Returning now back to FIG. 8, after starting at 802, sample pairs of records to be compared and potentially matched are loaded at 804. Then, acceptable FP/FN rates are configured at 806. Based on this, threshold values—in particular, a clerical threshold value 704 and an auto-link threshold 706—are determined at 808. Based on this, it is determined, at 810, if the number of clerical tasks is acceptable. "Acceptable" in this context should describe that a data steward or other users do not have too many manual matching decisions in a given time period (i.e., a number of manual matching decisions below a predetermined threshold over a given period of time). If that is not the case (i.e., a number of manual matching decisions is above a predetermined threshold over a given period of time)—case "N"—the clerical range is resized, at 812, by setting new clerical and auto-link threshold values. This is done in conjunction with determining, at 814, how to adjust FP/FN rates. If, on the other hand, the number of clerical tasks is acceptable at 810, the flowchart branches off—case "Y"—to the operational phase at 820 of the matching process.

Next in the flow, it is determined, at 816, if the records requiring clerical intention and the resulting error rates are satisfactory (i.e., the error rates are below a predetermined threshold to achieve the predefined performance). If that is the case—case "Y"—the process continues again with the operational phase at 820. If that is not the case (i.e., the error rates are above a predetermined threshold such that the predefined performance is not achievable)—case "N"—the process continues with revising, 818, the matching configuration settings. After that, the process flow returns back to 808.

The operational phase at 820 can basically be described as an iterative process. Basically, the system is in progress performing the matching and thereby capturing manual link decisions from the clerical group (compare reference numeral 710 from FIG. 7). Then, periodically, clerical tasks for the auto-link and the no-op groups are created that are close to the respective boundary, i.e., the respective threshold values. Based on this, it is calculated if the desired rate of FN/FP and clerical tasks still match the configuration. If the configuration is still met, the cyclic process continues. However, if that is not the case, the system has to determine newly adapted threshold values (compare step 808).

In other words, during the initial configuration phase, the threshold values are defined. This includes the threshold values for the auto-link and clerical groups. This may be performed for one of multiple scoring systems. The configuration can be executed for multiple entity definitions (types, categories like VIPs). The configuration process comprises thereby the following for each definition.

In an embodiment, sample pairs of records are loaded from the source data. These pairs are comparisons for which the user defines whether the two compared records are the same or not. Then, the user defines the accepted false positive and false negative rates. Furthermore, based on the path analysis data and possibly historical data, the system returns the percentage of comparisons that will (according to the predictions) create a clerical task, as well as the actual threshold values based on the FN/FP error rates. Next, the user—i.e., data engineer—now has the option to refine the configuration by increasing/reducing the amount of clerical tasks. This will change the accepted rate defined above. In an embodiment, system will determine automatically, which threshold values to adjust by optimizing the total number of falsely classified decisions. E.g., it may be possible to decrease the amount of clerical tasks significantly by accepting a lower amount of increase of the falsely identified auto-linkages. To reach the same amount of clericals changing the clerical threshold value might be required to accept a larger amount of falsely classified no-ops.

In an embodiment, if the user is still not satisfied with the amount of clerical/error rates, the problem cannot be solved solely by changing the threshold values. In this case, the configuration of the matching engine needs to be revised completely.

While the configuration is in production, manual linkage/unlinked assertions are captured. In addition, some decisions falling into the auto-linkage or no-ops buckets are still handled as clerical tasks in order to identify falsely classified comparisons. With the collected data, the system periodically executes the following steps: (i) the collected data of manual links/unlinks and the probing tasks are added to the pair of review data to create a new validation data set; (ii) using the validation data set, the system determines if the requested FP/FN, as well as the amount of clerical tasks were fulfilled or if the predictions were incorrect; (iii) if the predictions are correct, the system will continue normal operation until the next periodic check; and (iv) if the predictions were incorrect in the error rates or if the number of clerical tasks exceeds expectations, a re-configuration task is triggered. To resolve for this task, a configurator user must revise the configuration settings starting with the previous step (iii).

If the configuration settings are acceptable—as described above—in an initial step, it is determined whether a desired rate of false positives/negatives and clerical task match the configuration.

FIG. 9 shows a block diagram of a solution architecture 900 into which the new concept can be integrated. In an embodiment, the following components comprise the following: the machine-learning user interface (UX) 902 which is typically used to review the machine-learning algorithms deployed, trigger re-training, etc.; the machine-learning engine 904 represents the runtime environment for various machines having learning algorithms used by the configuring engineer/user. The matching engine 906—which may be, e.g., a probabilistic matching engine or a rule-based matching engine—for which new, smart configuration abilities provide the data-first learned matching algorithms configurations; the persistency layer 908 for the data, bucket definitions used by the matching engine for candidate list selections, matching engine configurations and machine-learning engine parameters; and, an integration component 910 making use of a data catalog with various capabilities from the data governance/data integration space which supports the orchestrating of all partial processes through the configurator UX 912 and the configurator engine 914.

Hence, if compared to traditional systems, there are three new components: the configurator UX 912, the configurator engine 914 and the configurator persistency 918 which is part of the persistency layer 908. The configurator UX 912 is a tool for the person performing the configuration of the data matching system (e.g., the MDM, the CRM, etc., system). The configurator user interface 912 ties together the end-two-end flow of configuring the data matching system for a new data source 916, in particular, to configure the matching engine with the one of multiple matching algorithms as needed. The experience is built with the data-first design principle which means that the required configuration is learned from the data itself and the configuring person only needs to review whether the proposed configuration is accurate.

The configurator engine 914 takes over tasks behind the configurator UX 912. It executes a logic, as described in the flowcharts before. Finally, the configurator persistency 918—which can also be part of the persistency layer 908—stores all required configuration data needed for the configurator engine 914 and the configurator UX 912.

The matching engine 906 can be adapted to work with different types of data records like person records in different flavors (e.g., leads from a CRM system, personal data in a healthcare system (patient data), citizen data, organization data, location data, product data, supplier data, technical data, just to name a couple of examples.

Furthermore, the governance catalog/information integration platform 910 is configured to deal with tasks such as metadata management, ontology handling and industry models, metadata discovery, reference data management and data quality analysis, data classification, and data transformation (ETL), data privacy policies and data access policies in respect to potentially various source data 916.

FIG. 10 shows a block diagram of a deduplication system 1000 comprising a processor 1002 and a memory 1004, communicatively coupled to said processor 1002, wherein the memory 1004 stores program code portions that, when executed, enable said processor 1002 to receive—in particular, by a receiving unit 1006—via a configurator interface, a specification of source data to be received, and receive the source data, to analyze—in particular, by an analysis system 1008— the received source data resulting in data profiling statistics and a classification of attributes of the source data, to determine—in particular by a determination unit 1010 for a data domain—at least one data domain associated with the source data using the profiling statistics and the classification and ontology data, and to determine—in particular, a determination unit 1012 for matching algorithms—for each determined data domain, a number of required matching algorithms for a data matching engine to execute data deduplication within the received source data.

In an embodiment, all functional units, modules and functional blocks in particular, the processor 1002, the memory 1004, the receiving unit 1006, the analysis system 1008, the determination unit 1010 and the determination unit 1012—may be communicatively coupled to each other for signal or message exchange in a selected 1:1 manner. Alternatively the functional units, modules and functional blocks can be linked to a system internal bus system 1014 for a selective signal or message exchange.

Embodiments of the invention may be implemented together with virtually any type of computer, regardless of the platform being suitable for storing and/or executing program code. FIG. 11 shows, as an example, a computing system 1100 suitable for executing program code related to the proposed method.

The computing system 1100 is only one example of a suitable computer system, and is not intended to suggest any limitation as to the scope of use or functionality of embodiments of the invention described herein, regardless, whether the computer system 1100 is capable of being implemented and/or performing any of the functionality set forth hereinabove. In the computer system 1100, there are components, which are operational with numerous other general purpose or special purpose computing system environments or configurations. Examples of well-known computing systems, environments, and/or configurations that may be suitable for use with computer system/server 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1100 may be described in the general context of computer system-executable instructions, such as program modules, being executed by a computer system 1100. Generally, program modules may include routines, programs, objects, components, logic, data structures, and so on that perform particular tasks or implement particular abstract data types. Computer system/server 1100 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1100 is shown in the form of a general-purpose computing device. The components of computer system/server 1100 may include, but are not limited to, one or more processors or processing units 1102, a system memory 1104, and a bus 1106 that couple various system components including system memory 1104 to the processor 1102. Bus 1106 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1100 typically includes a variety of computer system readable media. Such media may be any available media that is accessible by computer system/server 1100, and it includes both, volatile and non-volatile media, removable and non-removable media.

The system memory 1104 may include computer system readable media in the form of volatile memory, such as random access memory (RAM) 1108 and/or cache memory 1110. Computer system/server 1100 may further include other removable/non-removable, volatile/non-volatile computer system storage media. By way of example only, a storage system 1112 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1106 by one or more data media interfaces. As will be further depicted and described below, memory 1104 may include at least one program product having a set (e.g., at least one) of program modules that are configured to carry out the functions of embodiments of the invention.

The program/utility, having a set (at least one) of program modules 1116, may be stored in memory 1104 by way of example, and not limiting, as well as an operating system, one or more application programs, other program modules, and program data. Each of the operating systems, one or more application programs, other program modules, and program data or some combination thereof, may include an implementation of a networking environment. Program modules 1116 generally carry out the functions and/or methodologies of embodiments of the invention, as described herein.

The computer system/server 1100 may also communicate with one or more external devices 1118 such as a keyboard, a pointing device, a display 1120, etc.; one or more devices that enable a user to interact with computer system/server 1100; and/or any devices (e.g., network card, modem, etc.) that enable computer system/server 1100 to communicate with one or more other computing devices. Such communication can occur via Input/Output (I/O) interfaces 1114. Still yet, computer system/server 1100 may communicate with one or more networks such as a local area network (LAN), a general wide area network (WAN), and/or a public network (e.g., the Internet) via network adapter 1122. As depicted, network adapter 1122 may communicate with the other components of the computer system/server 1100 via bus 1106. It should be understood that, although not shown, other hardware and/or software components could be used in conjunction with computer system/server 1100. Examples, include, but are not limited to: microcode, device drivers, redundant processing units, external disk drive arrays, RAID systems, tape drives, and data archival storage systems, etc.

Additionally, the deduplication system 1000 for configuring data deduplication may be attached to the bus system 1106.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The inventive concept(s) in accordance with various embodiments of the present invention may be summarized by the following paragraphs:

1. A computer-implemented method for configuring data deduplication, said method comprising:
   - receiving source data,
   - analyzing said received source data, resulting in data profiling statistics and a classification of attributes of said source data
   - determining at least one data domain associated with said source data using said profiling statistics and said classification and ontology data, and
   - determining, for each determined data domain, a number of required matching algorithms for a data matching engine to execute data deduplication within said received source data.

2. The method according to clause 1, further comprising:
   - determining, for each determined required matching algorithm, a mapping of attributes of said source data to matching engine algorithm functions.

3. The method according to clause 2, wherein said determining which matching engine functions to be used comprises at least one selected out of said group consisting of:
   - determining at least one standardizer considering a plurality of source data attributes
   - determining at least one comparison function considering a plurality of source data attributes, and
   - determining bucket groups of source data records.

4. The method according to any of the preceding clauses, wherein said determining at least one data domain also at least one selected out of said group consisting of:
   - configuring, for each detectable data domain, a domain detection threshold value for said data matching engine, said domain detection threshold value being indicative of a domain being detected as a separate domain,
   - configuring a sub-class threshold value for a detection of said domain, said sub-class threshold value being indicative of a minimum number of detected sub-classes in a record of source data, and
   - determining a confidence threshold value indicative of an average value of confidence values of detected sub-classes to determine a detected class.

5. The method according to clause 4, also comprising:
   - determining a detected data domain if said required matching algorithm of said data matching engine has to be configured.

6. The method according to any of the preceding clauses, also comprising
   - configuring an auto-link threshold value depending on detected false positive and/or false negative results of said matching of records, and
   - configuring a clerical review rate threshold value depending on a number of clerical tasks to be performed.

7. The method according to clause 6, also comprising:

determining two records to be duplicates if their combined matching score value is greater than said auto-link threshold value.

8. The method according to clause 6, also comprising:

determining two records to be no duplicates if their combined matching score value is smaller than) clerical review rate threshold value.

9. The method according to clause 6, also comprising:

determining two records to be assessed clerically if said two records are not determined to said duplicates and if said two records are not determined to be no duplicates.

10. The method according to any of the preceding clauses, wherein said data profiling statistics and a classification of said source data results in at least one of said following:

technical metadata of said received source data, data quality metric values per attribute of said source data, relationship descriptors between sets of said source data, a data classification per attribute, and thereby a linkage of said attributes and their relationships.

11. The method according to any of the preceding clauses, wherein said data matching engine is a probabilistic data matching engine, a machine-learning based data matching engine or a deterministic data matching engine.

12. A deduplication system for configuring data deduplication, said system comprising:

a processor and a memory, communicatively coupled to said processor, wherein said memory stores program code portions that, when executed, enable said processor to receive, via a configurator interface, a specification of source data to be received, and receive said source data, analyze said received source data resulting in data profiling statistics and a classification of attributes of said source data, determine at least one data domain associated with said source data using said profiling statistics and said classification and ontology data, and determining, for each determined data domain, a number of required matching algorithms for a data matching engine to execute data deduplication within said received source data.

13. The method according to clause 12, wherein said program code portions enable said processor further to:

determine, for each determined required matching algorithm, a mapping of attributes of said source data to matching engine algorithm functions.

14. The method according to clause 13, wherein said determining which matching engine functions to be used comprises at least one selected out of said group consisting of:

determining at least one standardizer considering a plurality of source data attributes, determining at least one comparison function considering a plurality of source data attributes, and determining bucket groups of source data records.

15. The method according to any of the clauses 12 to 14, wherein said determining at least one data domain also at least one selected out of said group consisting of:

configuring, for each detectable data domain, a domain detection threshold value for said data matching engine, said domain detection threshold value being indicative of a domain being detected as a separate domain, configuring a sub-class threshold value for a detection of said domain, said sub-class threshold value being indicative of a minimum number of detected sub-classes in a records of source data, and determining a confidence threshold value indicative of an average value of confidence values of detected sub-classes to determine a detected class.

16. The method according to clause 15, also comprising:

determining a detected data domain if said required matching algorithm of said data matching engine has to be configured.

17. The method according to any of the clauses 12 to 16, wherein said program code portions enable said processor also to:

configure an auto-link threshold value depending on detected false positive and/or false negative results of said matching of records, and configuring a clerical review rate threshold value depending on a number of clerical tasks to be performed.

18. The method according to clause 16, wherein said program code portions enable said processor also to:

determine two records to be duplicates if their combined matching score value is greater than said auto-link threshold value.

19. The method according to clause 16, wherein said program code portions enable said processor also to:

determine two records to be no duplicates if their combined matching score value is smaller than said clerical review rate threshold value.

20. The method according to clause 16, wherein said program code portions enable said processor also to:

determine two records to be assessed clerically if said two records are not determined to said duplicates and if said two records are not determined to be no duplicates.

21. The method according to any of the clauses 12 to 20, wherein said data profiling statistics and a classification of said source data results in at least one of said following:

technical metadata of said received source data, data quality metric values per attribute of said source data, relationship descriptors between sets of said source data, a data classification per attribute, and thereby a linkage of said attributes and their relationships.

22. The method according to any of the clauses 12 to 21, wherein said data matching engine is a probabilistic data matching engine, a machine-learning based data matching engine or a deterministic data matching engine.

23. A computer program product for configuring data deduplication, said computer program product comprising a computer readable storage medium having program instructions embodied therewith, said program instructions being executable by one or more computing systems or controllers to cause said one or more computing systems to:

receive, via a configurator interface, a specification of source data to be received, and receive said source data, analyze said received source data resulting in data profiling statistics and a classification of attributes of said source data, determine at least one data domain associated with said source data using said profiling statistics and said classification and ontology data, and determine, for each determined data domain, a number of required matching algorithms for a data matching engine to execute data deduplication within said received source data.

What is claimed is:

1. A computer-implemented method, comprising:

receiving source data;

analyzing the source data, wherein the analyzing of the source data includes generating data profiling statistics from the source data and classifying a plurality of attributes of the source data for identifying data classes of the source data;

removing one or more attributes from the classified plurality of attributes of the source data to generate a set of classified attributes, wherein the removing of the one or more attributes is based at least one of:

a completeness score of each attribute of the one or more attributes that is below a mandatory completeness score, a distinct value score of each attribute of the one or more attributes that is below a mandatory distinctiveness score, or a timestamp associated with each attribute of the one or more attributes that is older than a threshold value, and the data profiling statistics include the completeness score and the distinct value score;

determining an intersection of the identified data classes and the set of classified attributes with an ontology graph;

determining, based on the intersection and the data profiling statistics, at least one data domain associated with the source data;

determining, for the at least one data domain associated with the source data, a numerical variable representing a total amount of required matching algorithms for a data matching engine to execute data deduplication within the source data;

determining that an attribute of the set of classified attributes is associated with at least two matching engine algorithm functions of a plurality of matching engine algorithm functions;

determining, based on the data profiling statistics, that the attribute includes multi-byte data;

removing, based on the determining that the attribute is associated with the at least two matching engine algorithm functions and the determining that the attribute includes the multi-byte data, a single byte matching engine algorithm function of the at least two matching engine algorithm functions;

determining, for each required matching algorithm of the required matching algorithms, a mapping of the set of classified attributes of the source data to the at least two matching engine algorithm functions, the mapping of the set of classified attributes of the source data including an alignment of attributes of a source record to attributes of a target record, the plurality of matching engine algorithm functions including a determination component outputting a numerical value describing a similarity between the source record and the target record; and merging the source record and the target record based on the numerical value that is above an auto-link threshold value.

2. The computer-implemented method of claim 1, wherein the at least two matching engine algorithm functions are selected from the group consisting of:

determining at least one standardizer considering a first set of attributes of the classified plurality of attributes;

determining at least one comparison function considering a second set of attributes of the classified plurality of attributes; and determining bucket groups of source data records comprising the source record and the target record.

3. The computer-implemented method of claim 1, wherein the determining of the at least one data domain associated with the source data is further based, at least in part, on:

configuring, for each detectable data domain, a domain detection threshold value for the data matching engine, the domain detection threshold value being indicative of a domain being detected as a separate domain;

configuring a sub-class threshold value for a detection of the domain, the sub-class threshold value being indicative of a minimum number of detected sub-classes in a record of the source data; and determining a confidence threshold value indicative of an average value of confidence values of the detected sub-classes to determine a detected class.

4. The computer-implemented method of claim 3, further comprising:

determining a detected data domain if a required matching algorithm of the required matching algorithms of the data matching engine has to be configured.

5. The computer-implemented method of claim 1, further comprising:

configuring the auto-link threshold value depending on at least one of a detected false positive result or a detected false negative result during a matching of the source record and the target record; and configuring a clerical review rate threshold value depending on a number of clerical tasks to be performed.

6. The computer-implemented method of claim 5, further comprising:

determining the source record and the target record to be duplicates in a case where a combined matching score value of the source record and the target record is greater than the auto-link threshold value.

7. The computer-implemented method of claim 5, further comprising:

determining the source record and the target record to not be duplicates in a case where a combined matching score value of the source record and the target record is smaller than the clerical review rate threshold value.

8. The computer-implemented method of claim 5, further comprising:

determining the source record and the target record to be assessed clerically if the source record and the target record are determined to be duplicates.

9. The computer-implemented method of claim 1, wherein the data profiling statistics and the classification of the plurality of attributes of the source data include one or more of:

technical metadata of the source data;

data quality metric values of each attribute of the plurality of attributes of the source data;

relationship descriptors between sets of the source data;

a data classification of each attribute of the plurality of attributes;

a linkage of the plurality of attributes;

relationships of the plurality of attributes.

10. The computer-implemented method of claim 1, wherein the data matching engine is selected from the group consisting of a probabilistic data matching engine, a machine-learning based data matching engine, and a deterministic data matching engine.

11. A computer system, comprising:

a processor; and a memory communicatively coupled to the processor, wherein the memory stores program instructions that, when executed by the processor, cause the processor to:

receive source data;

analyze the source data, wherein the analysis of the source data includes generating data profiling statistics from the source data and classifying a plurality of attributes of the source data for identifying data classes of the source data;

remove one or more attributes from the classified plurality of attributes of the source data to generate a set of classified attributes, wherein the removal of the one or more attributes is based on at least one of:

a completeness score of each attribute of the one or more attributes that is below a mandatory completeness score, a distinct value score of each attribute of the one or more attributes that is below a mandatory distinctiveness score, or a timestamp associated with each attribute of the one or more attributes that is older than a threshold value, and the data profiling statistics include the completeness score and the distinct value score;

determine an intersection of the identified data classes and the set of classified attributes with an ontology graph;

determine, based on the intersection and the data profiling statistics, at least one data domain associated with the source data;

determine, for the at least one data domain associated with the source data, a numerical variable representing a total amount of required matching algorithms for a data matching engine to execute data deduplication within the source data;

determine that an attribute of the set of classified attributes is associated with at least two matching engine algorithm functions of a plurality of matching engine algorithm functions;

determine, based on the data profiling statistics, that the attribute includes multi-byte data;

remove, based on the determination that the attribute is associated with the at least two matching engine algorithm functions and the determination that the attribute includes the multi-byte data, a single byte matching engine algorithm function of the at least two matching engine algorithm functions;

determine, for each required matching algorithm of the required matching algorithms, a mapping of the set of classified attributes of the source data to the at least two matching engine algorithm functions, the mapping of the set of classified attributes of the source data including an alignment of attributes of a source record to attributes of a target record, the plurality of matching engine algorithm functions including a determination component outputting a numerical value describing a similarity between the source record and the target record; and merge the source record and the target record based on the numerical value that is above an auto-link threshold value.

12. The computer system of claim 11, wherein the at least two matching engine algorithm functions are selected from the group consisting of:

determining at least one standardizer considering a first set of attributes of the classified plurality of attributes;

determining at least one comparison function considering a second set of attributes of the classified plurality of attributes; and determining bucket groups of source data records comprising the source record and the target record.

13. The computer system of claim 11, wherein the program instructions further cause the processor to:

configure, for each detectable data domain, a domain detection threshold value for the data matching engine, the domain detection threshold value being indicative of a domain being detected as a separate domain;

configure a sub-class threshold value for a detection of the domain, the sub-class threshold value being indicative of a minimum number of detected sub-classes in a record of the source data; and determine a confidence threshold value indicative of an average value of confidence values of the detected sub-classes to determine a detected class.

14. The computer system of claim 13, wherein the program instructions further cause the processor to:

determine a detected data domain if a required matching algorithm of the required matching algorithms of the data matching engine has to be configured.

15. The computer system of claim 11, wherein the program instructions further cause the processor to:

configure the auto-link threshold value depending on at least one of a detected false positive result or a false negative result of a matching of the source record and the target record; and configure a clerical review rate threshold value depending on a number of clerical tasks to be performed.

16. The computer system of claim 14, wherein the program instructions further cause the processor to:

determine the source record and the target record to be duplicates in a case where a combined matching score value of the source record and the target record is greater than the auto-link threshold value.

17. The computer system of claim 15, wherein the program instructions further cause the processor to:

determine the source record and the target record to not be duplicates in a case where a combined matching score value of the source record and the target record is smaller than the clerical review rate threshold value.

18. The computer system of claim 14, wherein the program instructions further cause the processor to:

determine the source record and the target record to be assessed clerically if the source record and the target record are determined to be duplicates.

19. The computer system of claim 11, wherein the data profiling statistics and the classification of the plurality of attributes of the source data include one or more of:

technical metadata of the source data;

data quality metric values of each attribute of the plurality of attributes of the source data;

relationship descriptors between sets of the source data;

a data classification of each attribute of the plurality of attributes;

a linkage of the plurality of attributes; and relationships of the plurality of attributes.

20. The computer system of claim 11, wherein the data matching engine is selected from the group consisting of a probabilistic data matching engine, a machine-learning based data matching engine, or a deterministic data matching engine.

21. A computer program product comprising:

a computer readable storage medium having program instructions embodied therewith to perform operations comprising:

receiving source data;

analyzing the source data, wherein the analysis of the source data includes generating data profiling statistics from the source data and classifying a plurality of attributes of the source data for identifying data classes of the source data;

removing one or more attributes from the classified plurality of attributes of the source data to generate a set of classified attributes, wherein the removal of the one or more attributes is based on at least one of:

a completeness score of each attribute of the one or more attributes that is below a mandatory completeness score, a distinct value score of each attribute of the one or more attributes that is below a mandatory distinctiveness score, or a timestamp associated with each attribute of the one or more attributes that is older than a threshold value, and the data profiling statistics include the completeness score and the distinct value score;

determining an intersection of the identified data classes and the set of classified attributes with an ontology graph;

determining, based on the intersection and the data profiling statistics, at least one data domain associated with the source data;

determining, for the at least one data domain associated with the source data, a numerical variable representing a total amount of required matching algorithms for a data matching engine to execute data deduplication within the source data;

determining that an attribute of the set of classified attributes is associated with at least two matching engine algorithm functions of a plurality of matching engine algorithm functions;

determining, based on the data profiling statistics, that the attribute includes multi-byte data;

removing, based on the determination that the attribute is associated with the at least two matching engine algorithm functions and the determination that the attribute includes the multi-byte data, a single byte matching engine algorithm function of the at least two matching engine algorithm functions;

determining, for each required matching algorithm of the required matching algorithms, a mapping of the set of classified attributes of the source data to the at least two matching engine algorithm functions, the mapping of the set of classified attributes of the source data including an alignment of attributes of a source record to attributes of a target record, the plurality of matching engine algorithm functions including a determination component outputting a numerical value describing a similarity between the source record and the target record; and merging the source record and the target record based on the numerical value that is above an auto-link threshold value.

* * * * *